United States Patent [19]

Shimizu

[11] Patent Number: 5,027,427
[45] Date of Patent: Jun. 25, 1991

[54] MONITORING SYSTEM FOR RADIO COMMUNICATION APPARATUS

[75] Inventor: Toshimitsu Shimizu, Tokyo, Japan
[73] Assignee: NEC Corporation, Tokyo, Japan
[21] Appl. No.: 358,103
[22] Filed: May 30, 1989
[30] Foreign Application Priority Data May 28, 1988 [JP] Japan .............................. 63-131234

[51] Int. Cl.⁵ .......................................... H04B 17/00
[52] U.S. Cl. ...................................... 455/67; 455/226
[58] Field of Search ................ 455/50, 54, 57, 63, 455/67, 226; 370/13, 14, 17; 340/825.01, 825.06, 825.16; 371/29.1, 32

[56] References Cited

U.S. PATENT DOCUMENTS 4,603,325 7/1986 Marino et al. ...................... 455/67
4,648,123 3/1987 Schrock ............................. 455/67
4,780,885 10/1988 Paul et al. ......................... 455/67

Primary Examiner—Curtis Kuntz
Attorney, Agent, or Firm—Sughrue, Mion, Zinn, Macpeak & Seas

[57] ABSTRACT

A monitoring system and method for a radio communication apparatus, including a base station and a plurality of portable units, for monitoring a state of each of the portable units. The base station transmits a first asking signal to each of the portable units at each occurrence of a first predetermined time period. Each portable units replys to the first asking signal only when a state of the portable units becomes abnormal. The base station also transmits a second asking signal to each of the portable units at each occurrence of a second predetermined time period. Each portable units replys to the second asking signal to indicate an operation state of the portable unit.

4 Claims, 4 Drawing Sheets (BASE STATION)

(PORTABLE UNIT)

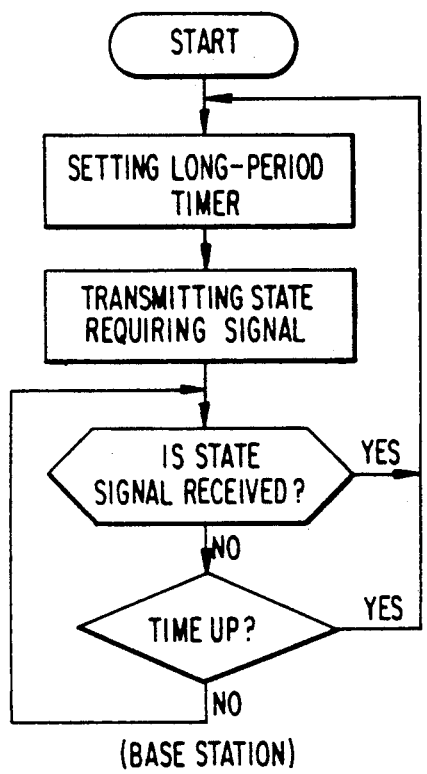
FIG. 5(a) (BASE STATION)
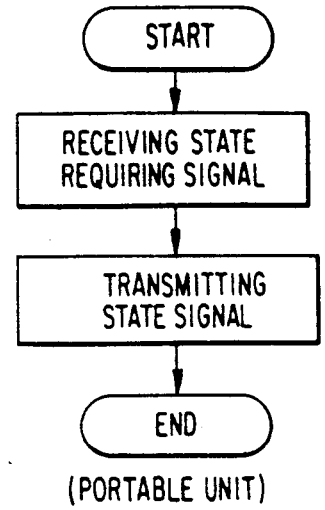
FIG. 5(b) (PORTABLE UNIT)
FIG. 6(a)
INQUIRY SIGNAL: PREAMBLE | SYNC CODE | SPM CODE | UNIT ID NUMBER | ─────
FIG. 6(b)
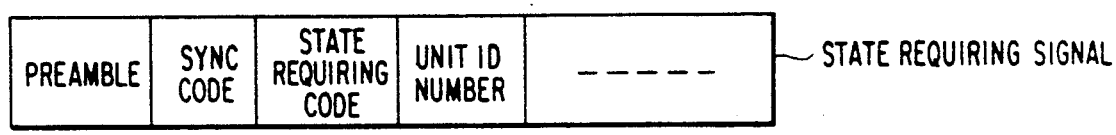
STATE REQUIRING SIGNAL: PREAMBLE | SYNC CODE | STATE REQUIRING CODE | UNIT ID NUMBER | ─────
FIG. 7(a)
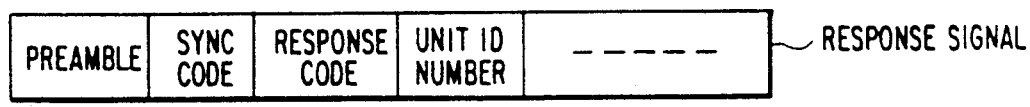
RESPONSE SIGNAL: PREAMBLE | SYNC CODE | RESPONSE CODE | UNIT ID NUMBER | ─────
FIG. 7(b)
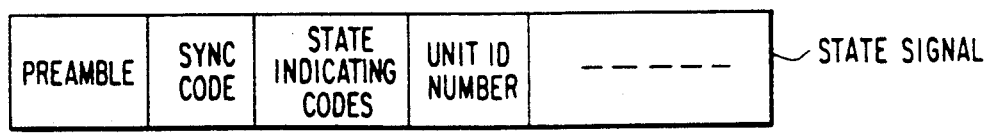
STATE SIGNAL: PREAMBLE | SYNC CODE | STATE INDICATING CODES | UNIT ID NUMBER | ─────

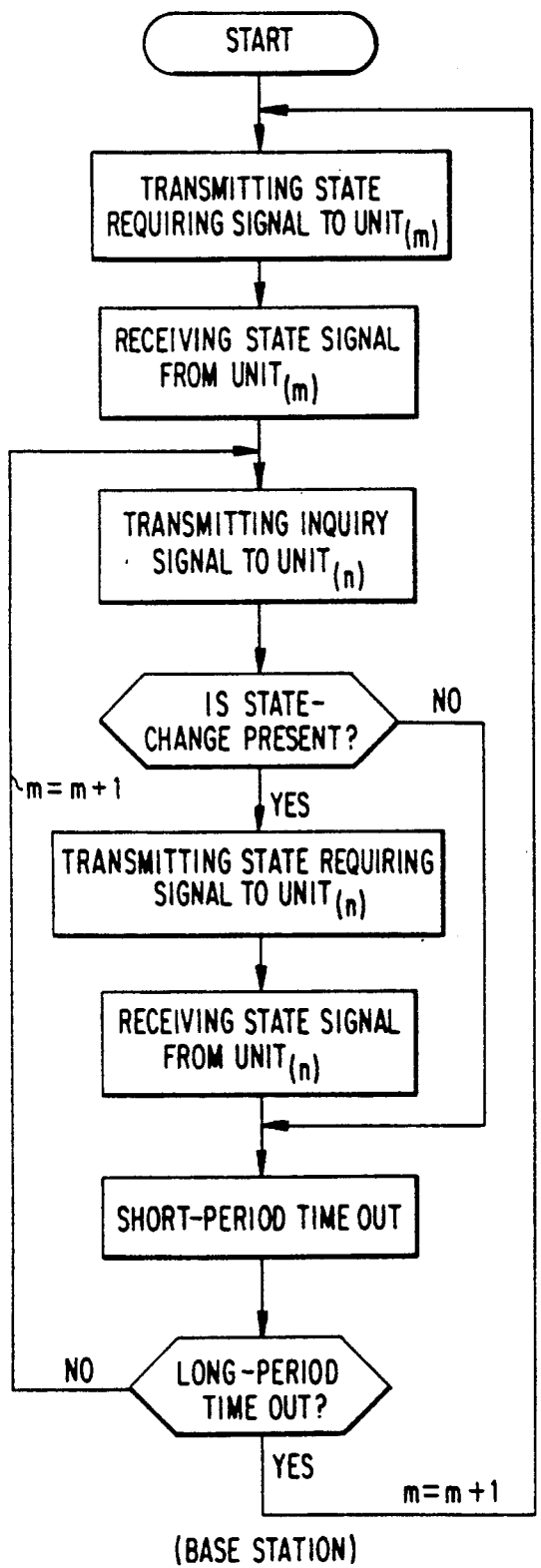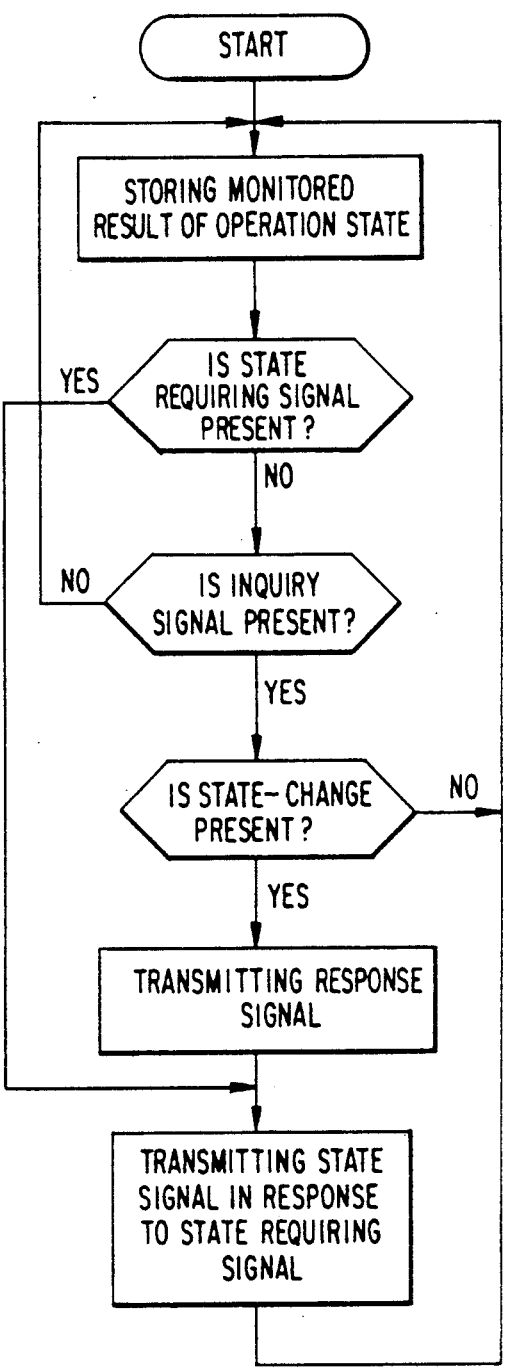

MONITORING SYSTEM FOR RADIO COMMUNICATION APPARATUS

BACKGROUND OF THE INVENTION

The present invention relates to a radio communication apparatus consisting of a base station a plurality of portable units disposed around the base station and, possibly a relay unit connecting the base station with at least one portable unit, and more particularly, to a monitoring system for a radio communication apparatus for monitoring the operation of the portable unit and relay unit through the base station.

Conventionally, in a radio communication apparatus of this kind the respective operations of the portable unit and the relay unit are cyclically monitored through the base station for a predetermined period in a polling manner. Namely the base station transmits an inquiry signal to each of the portable (or relay) units and then the portable (or relay) unit, which receives the inquiry signal, replies by sending an answer signal to the base station. This answer signal includes information of the operation states of the unit, i.e.. normal or abnormal states of respective circuitry parts. After the reception of the answer signal and the execution of a preprogrammed treatment responsive to the answer signal, the base station sequentially transmits the inquiry signal to another unit. If the base station does not receive an answer signal from a unit within a predetermined period (e.g.,a few seconds) after transmitting the inquiry signal, then the base station determines that the unit is in trouble. In this case, the base station appropriately addresses the trouble and then transmits an inquiry signal to the next unit.

In the aforementioned monitoring system of the prior art, however, the base station transmits the inquiry signal to each unit for a relatively short time period. Consequently each unit transmits the answer signal indicating its state to the base station for such a short time period. According to this system, the unit has to respond to the base station if its operation state is normal. In this case. each unit is frequently accessed and required to respond for monitoring purposes. Therefore, this monitoring operation wastes power, which is a serious problem especially if the portable (or relay) unit is powered by a battery and is located in remote rural areas.

SUMMARY OF THE INVENTION

It is therefore an object of the present invention to provide a monitoring system for a radio communication apparatus which is capable of efficiently monitoring portable and relay units without wasting power.

According to the present invention, there is provided a monitoring system for a radio communication apparatus including a base station and a plurality of portable units for monitoring a state of each of the portable units through the base station. The monitoring system consists of means disposed in the base station for transmitting a first asking signal to each of the portable units for a predetermined short period: means disposed in each of the portable stations for sending a response signal in response to the first asking signal only when a state of the portable unit becomes abnormal: means disposed in the base station for transmitting a second asking signal to each of the portable units in response to the response signal and for a predetermined long period; and means disposed in each of the portable units for transmitting a state signal to the base station in response to the second asking signal, wherein the state signal indicates an operation state of each of the portable units.

BRIEF DESCRIPTION OF THE DRAWINGS

FIGS. 5(a) and 5(b) are flow charts showing long-period monitoring operations of the base station and the portable unit respectively;

FIGS. 6(a) and 6(b) show signal-format examples of an inquiry signal and a state requiring signal transmitted from the base station to the portable unit, associated with the short-period and longperiod monitoring operations, respectively:

FIGS. 7(a) and 7(b) show signal-format examples of a response signal and a state signal transmitted from the portable unit to the base station associated with the short-period and long-period monitoring operations respectively, and FIGS. 8(a) and 8(b) are flow charts showing monitoring operations which include short-period monitoring and long-period monitoring operations of the base station and the portable unit.

DETAILED DESCRIPTION OF THE PREFERRED EMBODIMENT

One embodiment of the present invention will be described with reference to the accompanying drawings.

Figure 1:
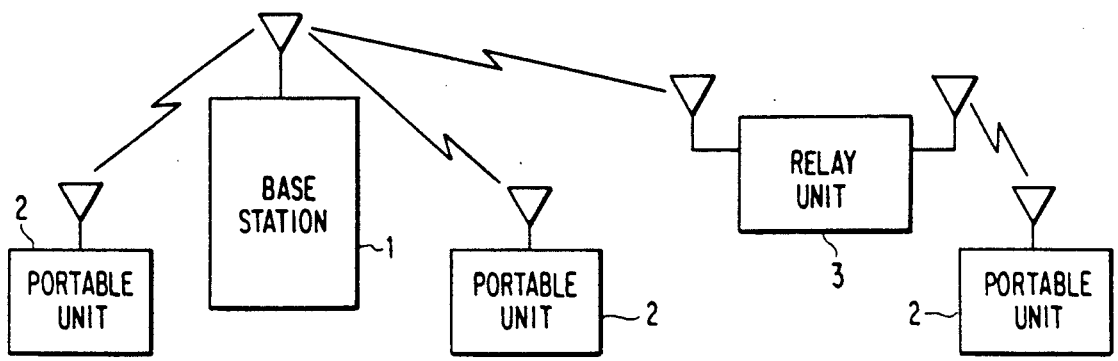
FIG. 1 is a block diagram of a radio communication apparatus to which the present invention can be applied.
Figure 2:
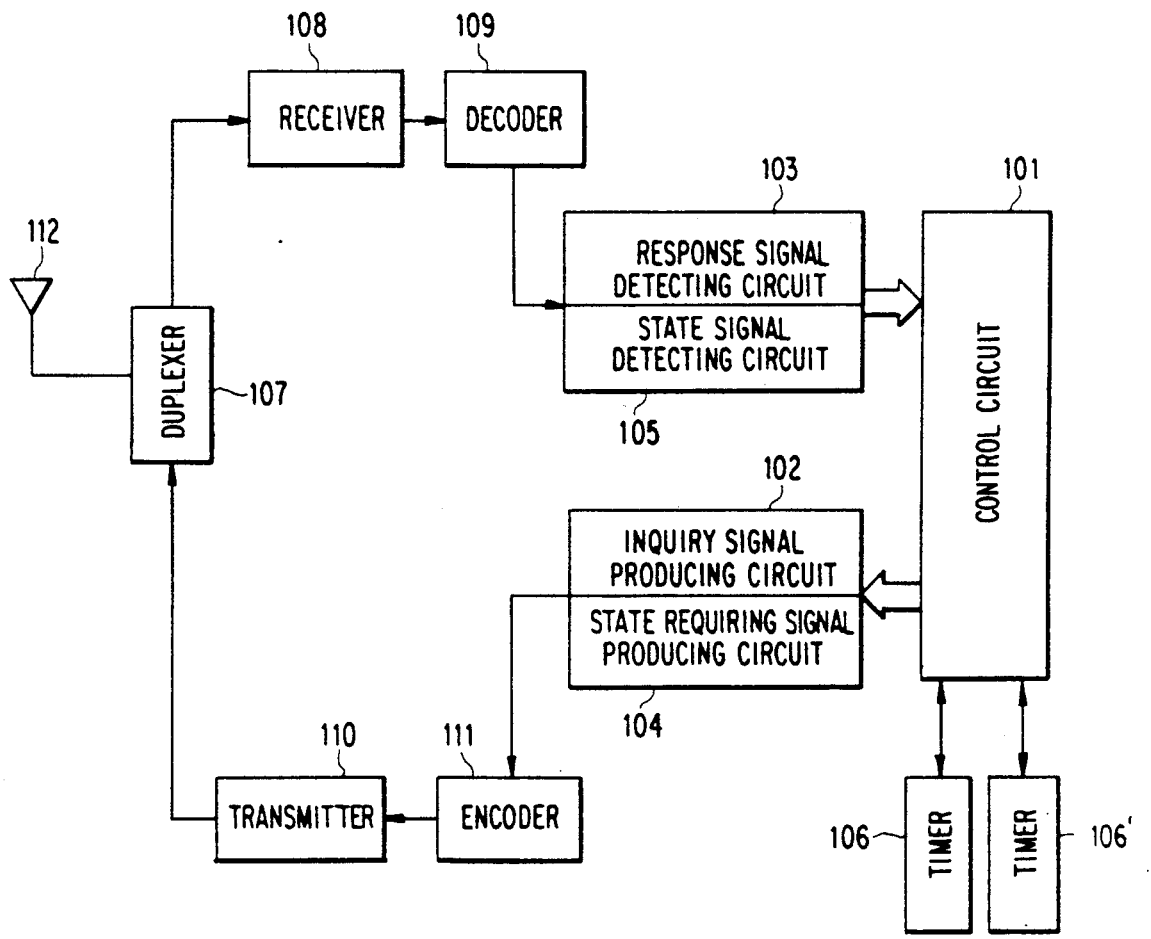
FIG. 2 is, a block diagram of a base station according to an embodiment of the present invention.
Figure 3:
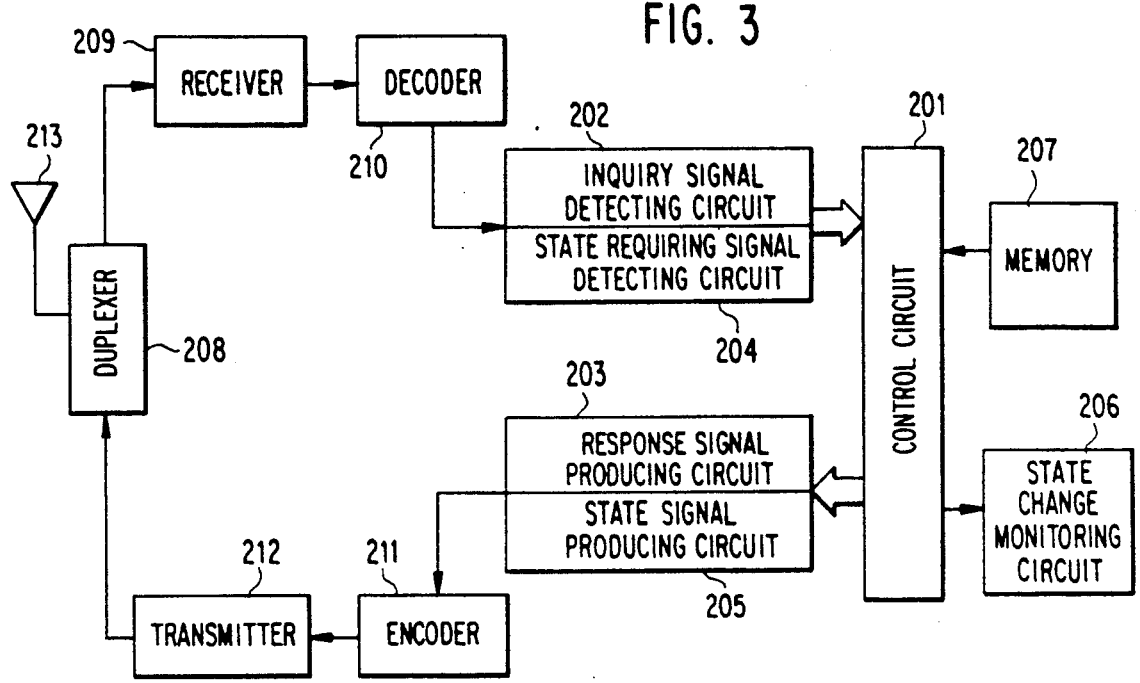
FIG. 3 is a block diagram of a portable unit according to the embodiment of the present invention.

As shown in FIG. 1, a radio communication apparatus includes a base station 1. a plurality of portable units 2 and can possibly also include at least one relay unit 3 connecting the base station with a portable unit 2. Further, as shown in FIG. 2, the base station 1 consists of a control circuit 101, an inquiry signal producing circuit 102, a response signal detecting circuit 103 a state requiring signal producing circuit 104, a state signal detecting circuit 105, timer circuits 106 and 106', a duplexer 107, a receiver 108, a decoder 109, a transmitter 110 an encoder 111 and an antenna 112. As shown in FIG. 3, on the other hand, the portable (or relay) unit consists of a control circuit 201, an inquiry signal detecting circuit 202, a response signal producing circuit 203, a state requiring signal detecting circuit 204, a state signal producing circuit 205 a state change monitoring circuit 206, a memory circuit 207, a duplexer 208, a receiver 209, a decoder 210, an encoder 211, a transmitter 212 and an antenna 213.

Next, the monitoring system of the present invention will be described with reference to the drawings.

Under the control circuit 101 (FIG. 2) of the base station, there are provided timers 106 and 106' with which the base station performs short period (e.g.. one second) and long period (e.g., one minute) monitoring operations, respectively.

The following is a description of the short period monitoring operation.

Figure 4A:
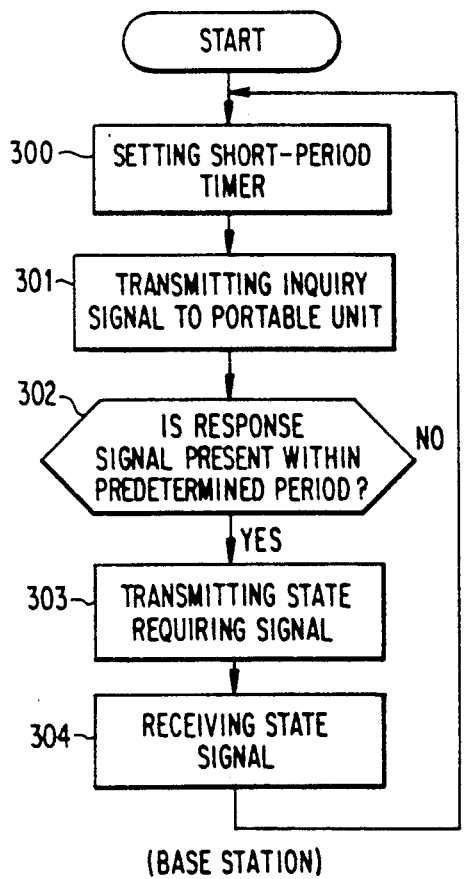
FIGS. 4(a) and 4(b) are flow charts showing short-period monitoring operations of the base station and the portable unit, respectively.
Figure 4B:
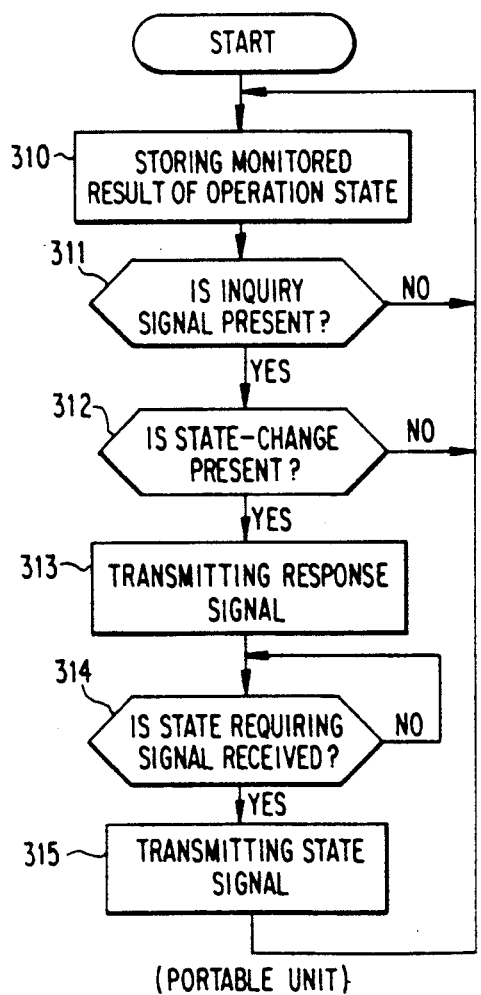

In the base station, as shown in FIG. 2(a), the control circuit 101 sets the short-period timer 106 (Step 300 in FIG. 4(a)) and the inquiry signal producing circuit 102 produces the inquiry signal which is transmitted to one portable (or relay) unit (Step 301). The inquiry signal (as shown in FIG. 6(a)) contains a preamble, a sync code, a code SPM indicating a short-period monitoring operation, and an identification (ID) number of the unit to which the base station transmits the inquiry signal. This inquiry signal is transmitted through the encoder 111, the transmitter 110, and the duplexer 107.

If the portable (or relay) unit has an operation state change, it sends a response signal within a predetermined period. This signal is detected by the response signal detecting circuit 103 of the base station, through the antenna 112, duplexer 107, receiver 108 and decoder 109. FIG. 7(a) shows an example of the response signal containing a preamble, sync code, response code and unit ID number. The base station control circuit 101 then determines whether or not the reception is acknowledged within the predetermined period (Step 302). If the response signal is not received from the portable (or relay) unit within the predetermined period, then the determination of Step 302 is NO. Consequently, the routine is returned to the preceding Step 300 so that the next portable (or relay) unit can be checked for an operation state change.

If the response signal from the portable (or relay) unit is received and acknowledged within the predetermined time then, the determination of Step 302 is YES. Consequently the routine is advanced to Step 303. At Step 303, the control circuit 101 directs the state requiring signal producing circuit 104 to transmit a state requiring signal to the unit which delivered the response signal. This state requiring signal is transmitted out through the encoder 111, transmitter 110, duplexer 107 and antenna 112. FIG. 6(b) shows an example of the state requiring signal containing a preamble, sync code, state requiring code and unit ID number. In response to the state requiring signal, the portable (or relay) unit transmits a state signal which is detected by the state signal detecting circuit 105 in the base station (Step 304), through the antenna 112, the receiver 108 and the decoder 109. FIG. 7(b) shows an example of the state signal containing a preamble, sync code, state indicating codes and the unit ID number. As a result, the control circuit 101 obtains the state signal and executes a predetermined treatment. After this treatment, the routine is returned to the preceding Step 300, and the next portable (or relay) unit is checked for an operation state change.

The following describes in more detail the operations of the portable (or relay) unit during the short-period monitoring operation. In the portable (or relay) unit shown in FIG. 3, the control circuit 201 directs the state change monitor for circuit 206 to monitor the occurrence of an alarm or the like in its operation states, and to store or hold the monitored result in the memory circuit 207 (Step 310). At the same time, the inquiry of Step 311, is conducted to determine whether or not the inquiry signal is received. Namely, the aforementioned inquiry signal sent by the base station is received and detected by the inquiry signal detecting circuit 202, through the antenna 213 duplexer 208, receiver 209 and decoder 210. If the inquiry signal is assigned to the unit itself then the reception acknowledgement is outputted to the control circuit 201.

As a result, the determination of the Step 311 is "YES", and the control circuit 201 then accesses the memory circuit 207 to read out the stored content, and determines whether or not the state has changed (Step 312). If the determination of Step 312 is "NO" (i.e., the state has not changed and is normal), then the routine is returned to the preceding Step 310 so that the control circuit 201 performs the monitoring operation of Steps 310 and 311. If the determination of Step 312 is "YES" (i.e., the state has changed and the abnormal change (alarm) has been stored) then the control circuit 201 makes the response signal producing circuit 203 produce the response signal and sends it back to the base station. As a result, the response signal is transmitted out through the encoder 211, transmitter 212, duplexer 213 and antenna 213 (Step 313).

After this, when the base station transmits the state requiring signal, this signal is received and detected by the state require signal detecting circuit 204, through the antenna 213, the duplexer 208, the receiver 209 and the decoder 210. If the state requiring signal is assigned to the unit, the detection result is informed to the control circuit 201. As a result this control circuit 201 performs Step 314, which determines whether the state requiring signal has been received from the base station. With the reception acknowledgement (i.e., "YES" Step 314), the control circuit 201 makes the state signal producing circuit 205 transmit the state signal indicating the present operation states of respective circuitry parts. As a result, the state signal is transmitted out through the encoder 211, the transmitter 212 the duplexer 208 and the antenna 213 (Step 315). After this, the control circuit 201 continues the unit monitoring operation (Step 310).

By the above-mentioned short-period monitoring operation, the base station can detect the unit in which the operation state is changed to the alarmed state. However, it is conceivable that a portable (or relay) unit could be unable to return the response because of a malfunction in the transmitter, the receiver, or the power source. Therefore, the base station performs a long-period monitoring operation, in parallel with the short-period monitoring operation thus far described. FIGS. 5(a) and 5(b) are flow charts showing long period monitoring operations of the base station and the portable (or relay) unit. As shown in FIG. 5(a), the base station sequentially transmits a state requiring signal to each of the portable (or relay) units at each occurrence of a relatively long cycle period (e.g., one minute). In response, each of the portable (or relay) units replies with a state signal to the base station as shown in FIG. 5(b).

FIG. 8(a) and 8(b) are flow charts showing combination flows of the long-period monitoring operation and short-period monitoring operation of the base station and the portable (or relay) unit according to the present invention.

As described in detail hereinbefore according to the present invention, each portable or relay unit raises an alarm if its operation state changes and then informs the present operation state to the base station at a long cycle period. Each unit can be monitored, but only the unit having an operation state change transmits it to the base station for the short-period inquiry. Thus any useless transmission is eliminated, and consequently the power consumption is reduced.

What is claimed is:

1. A monitoring system for a radio communication apparatus including a base station and a plurality of portable units, said system for monitoring a set of each said portable units through said base station, and comprising:

means disposed in said base station for transmitting a first asking signal to each of said portable units at occurrences of a first predetermined period;

means disposed in each of said portable units for replying a response signal in response to said first asking signal only when an operation state of said portable unit becomes abnormal;

means disposed in said base station for transmitting a second asking signal to each of said portable units in response to said response signal and at occurrences of a second predetermined period which is longer in time than said first predetermined period; and means disposed in each of aid portable units for transmitting a state signal to said base station in response to said second asking signal, said state signal indicating an operation state of said portable unit.

2. A monitoring system for a radio communication apparatus including a base station and a plurality of portable units, said system for monitoring an operational state of each of said portable units through said base station, and comprising:

means disposed in said base station for transmitting a first asking signal to each of said portable units at occurrences of a first predetermined period;

means disposed in each of said portable units for replying a response signal in response to said first asking signal only when a state of said portable unit becomes abnormal;

means disposed in said base station for transmitting a second asking signal to each of said portable units in response to said response signal;

means disposed in said base station for transmitting a third asking signal to each of said portable units at occurrences of a second predetermined period, said second predetermined period being longer than said first predetermined period; and means deposed in each of said portable units for transmitting a state signal to said base station in response to said second or third asking signal, said state signal indicating an operation state of said portable unit.

3. A monitoring method for a radio communication apparatus including a base station and a plurality of portable units, said method comprising the steps of:

transmitting a first requiring signal from said base station to each of said portable units at occurrences of a first predetermined cycle period;

replying a first response signal from a portable unit to said base station only when said portable unit has a change of an operation state;

transmitting a second requiring signal from said base station to each of said portable units when said base station receives said first response signal from said portable unit;

transmitting a third requiring signal from said base station to each of said portable units at occurrences of a second predetermined cycle period, said second predetermined cycle period being longer than said first predetermined cycle period; and replying a second response signal from each of said portable units to said base station in response to said second or third requiring signal, said second response signal including information of the operation state in each of said portable units.

4. A radio communication system including one base station and portable units existing around said base station, said system for monitoring a state of each of said portable units by said base station, and comprising:

first means belonging to said base station for polling said units sequentially for the presence of a change in their operation states, said first means performing said polling at each occurrence of a first predetermined time period;

second means belonging to each of said portable units for storing presence of a change in the operation state thereof;

third means belonging to each of said portable units for informing said base station of the change in the operation state thereof;

fourth means belonging to said base station for acknowledging the presence of a change in the operation state of any one or more of said portable units;

fifth means belonging to said base station for forwarding in response to the acknowledgement of an operation state change, a first requirement for requiring information of the operation state of each of said portable units to be transmitted;

sixth means belonging to each of said portable units for transmitting the information of the operation state thereof to said base station upon reception of the requirement;

seventh means belonging to said base station for forwarding a second requirement for requiring information of the operation state of each of said portable units thereof to be transmitted, said seventh means performing said requiring at each occurrence of a second predetermined period of which is substantially longer in time with respect to said first predetermined time; and eighth means belonging to said each of said portable units for transmitting the information of the operation state thereof to said base station upon reception of said second requirement.

* * * * *

UNITED STATES PATENT AND TRADEMARK OFFICE
CERTIFICATE OF CORRECTION

PATENT NO. : 5,027,427
DATED : June 25, 1991
INVENTOR(S) : Toshimitsu SHIMIZU It is certified that error appears in the above-identified patent and that said Letters Patent is hereby corrected as shown below:

Col. 1, line 61, delete ":" and insert --;--.

Col. 1, line 64, delete ":" and insert --;--.

Col. 5, line 3, delete "set" and insert --state--.

Signed and Sealed this

Fifth Day of January, 1993

Attest:

DOUGLAS B. COMER

*Attesting Officer*     *Acting Commissioner of Patents and Trademarks*